(12) United States Patent
Ashar et al.

(10) Patent No.: US 10,778,462 B2
(45) Date of Patent: Sep. 15, 2020

(54) DETERMINING PREFERENCES IN A SENSOR DEVICE PLATFORM

(71) Applicant: Nuro Technologies, Inc., San Jose, CA (US)

(72) Inventors: Premal Ashar, Sunnyvale, CA (US); Vaibhavi Ashar, Sunnyvale, CA (US)

(*) Notice: Subject to any disclaimer, the term of this patent is extended or adjusted under 35 U.S.C. 154(b) by 62 days.

(21) Appl. No.: 16/028,104

(22) Filed: Jul. 5, 2018

(65) Prior Publication Data

US 2019/0013957 A1    Jan. 10, 2019

Related U.S. Application Data

(60) Provisional application No. 62/529,106, filed on Jul. 6, 2017.

(51) Int. Cl.
| | | |
|---|---|---|
| *H04L 12/28* | (2006.01) | |
| *H05B 37/02* | (2006.01) | |
| *H05B 47/19* | (2020.01) | |
| *H05B 47/105* | (2020.01) | |

(52) U.S. Cl.
CPC ........ *H04L 12/282* (2013.01); *H04L 12/2814* (2013.01); *H04L 12/2821* (2013.01); *H04L 12/2829* (2013.01); *H04L 12/2838* (2013.01); *H04L 2012/2841* (2013.01); *H05B 47/105* (2020.01); *H05B 47/19* (2020.01)

(58) Field of Classification Search
CPC .............. H04L 12/2814; H04L 12/282; H04L 12/2821; H04L 12/2829; H04L 12/2838; H04L 2012/2841; H05B 37/0227; H05B 37/0272
See application file for complete search history.

(56) References Cited

U.S. PATENT DOCUMENTS

| | | | |
|---|---|---|---|
| 2008/0191045 A1* | 8/2008 | Harter ................ | G05D 23/1904 236/91 D |
| 2016/0259308 A1* | 9/2016 | Fadell .................... | G05B 15/02 |

* cited by examiner

*Primary Examiner* — Ramesh B Patel
(74) *Attorney, Agent, or Firm* — Joseph L. Acayan

(57) ABSTRACT

Implementations generally relate to devices, apparatuses, and methods for determining preferences in a residential sensor device platform. In some implementations, a residential sensor device includes one or more sensors operative to sense activity in a living space, one or more processors, and logic encoded in one or more non-transitory computer-readable storage media for execution by the one or more processors. The logic when executed is operable to perform operations including receiving a plurality of user changes to at least one default setting of the sensor device. The logic when executed is further operable to perform operations including determining a setting adjustment policy, wherein the setting adjustment policy is based on user change information associated with the plurality of user changes. The logic when executed is further operable to perform operations including adjusting the at least one default setting based on the setting adjustment policy.

20 Claims, 4 Drawing Sheets

DETERMINING PREFERENCES IN A SENSOR DEVICE PLATFORM

BACKGROUND

Home automation has been a long-term desire. Control systems enable aspects of a home such as lighting to be controlled. However, cost-effective and user-friendly home automation is still far away. Present home automation systems are expensive, hard to install, and difficult to update. Such home automation systems typically require a user to understand complicated and difficult instructions to control aspects of a home.

SUMMARY

Implementations generally relate to devices, apparatuses, and methods for determining preferences in a residential sensor device platform. In some implementations, a residential sensor device includes one or more sensors operative to sense activity in a living space, one or more processors, and logic encoded in one or more non-transitory computer-readable storage media for execution by the one or more processors. The logic when executed is operable to perform operations including receiving a plurality of user changes to at least one default setting of the sensor device. The logic when executed is further operable to perform operations including determining a setting adjustment policy, wherein the setting adjustment policy is based on user change information associated with the plurality of user changes. The logic when executed is further operable to perform operations including adjusting the at least one default setting based on the setting adjustment policy.

Other aspects and advantages of the described implementations will become apparent from the following detailed description, taken in conjunction with the accompanying drawings, illustrating by way of example the principles of the described implementations.

DETAILED DESCRIPTION

Implementations generally relate to systems, apparatuses, and methods of determining user preferences in a residential sensor device platform. As described in more detail herein, in various implementations, a residential sensor device in a living space receives and tracks user changes to at least one default setting of the sensor device. The sensor device determining a setting adjustment policy, which is based on user change information associated with the user changes. The sensor device automatically adjusts the at least one default setting based on the setting adjustment policy.

Various implementations of the residential sensor device platform provide an infrastructure within and around a residence that includes sensor-enabled devices within rooms of the residence, as well as exterior to the residence. Sensor-enabled devices to auto-configure themselves (e.g., lighting levels, etc.) to users based on machine learning.

Note that the reference to the phrase "living space" may include indoor and outdoor spaces, depending on the particular implementations. Furthermore, in some implementations, the residential sensor device platform provides learning of common usage patterns by tracking and learning of routine and pattern-based activity that eventually, and automatically configures home automation in order to determine the occurrence of intrusions in a home. Some implementations provide the sensing of motion or activity, temperature, and daylight. Further, some implementations provide environment control features, autonomous and networked operation, and cloud intelligence.

As described in more detail herein, implementations provide distributed decision making intelligence at each sensor device for day-to-day use, as well as a network for advanced analytics and pattern and behavior learning. Implementations also provide an intelligent wireless mesh that is self-healing, self-learning, and expandable. Implementations also provide sensor devices in each room or living area of a residency, as well as external to a residency, where the sensor devices provide activity tracking, ambient light, temperature, energy metering, camera, air quality, carbon monoxide (CO) detection, etc. Implementations also provide an efficient, cost-effective, and user-friendly home Internet of Things (IoT) platform including ubiquitous digital, plug and play sensing, stand-alone operation, Wi-Fi mesh, distributed algorithms, self-learning, self-healing, etc.

Figure 1:
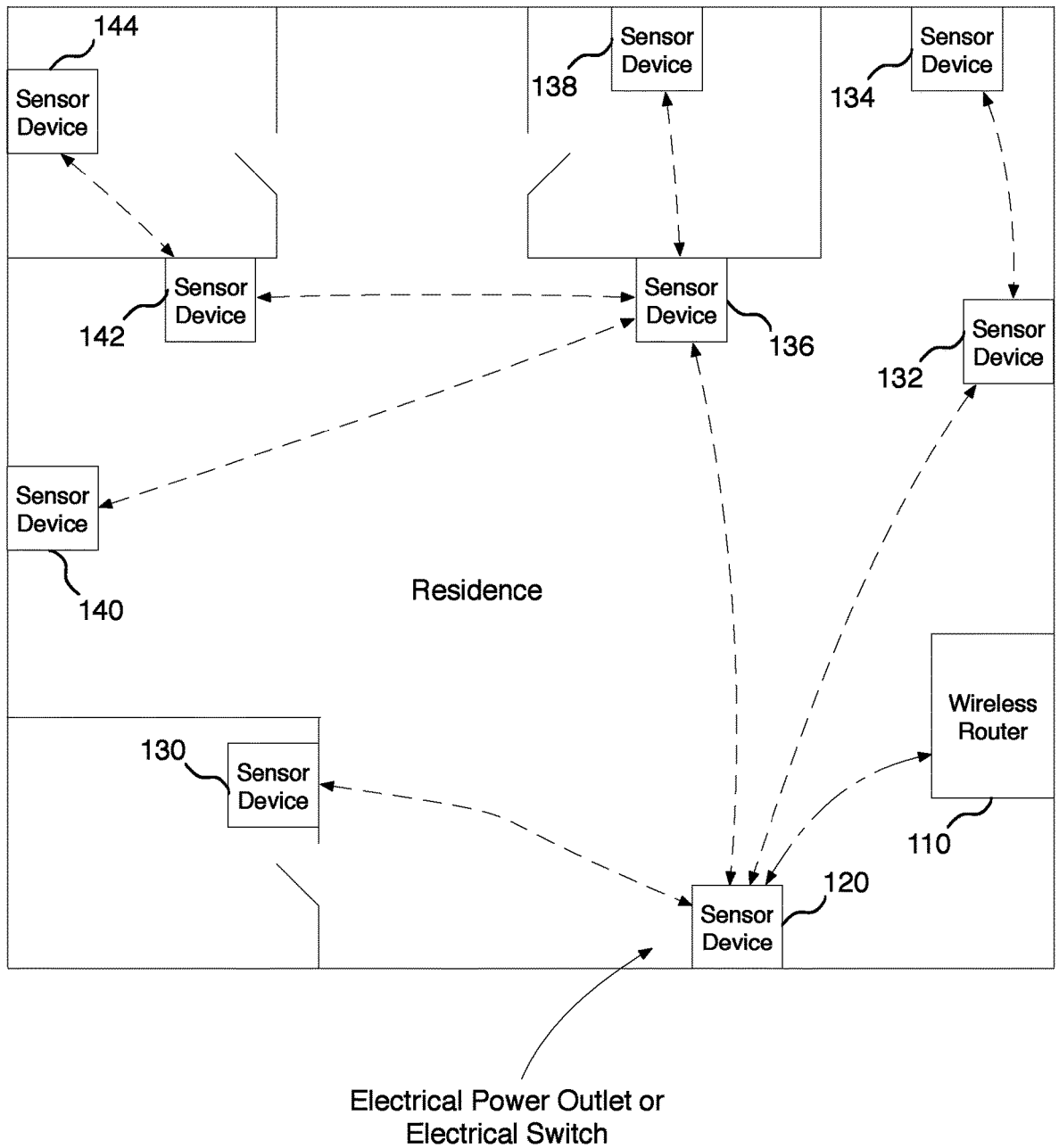
FIG. 1 illustrates a block diagram of an example residential sensor device platform, according to some implementations.

FIG. 1 illustrates a block diagram of an example residential sensor device platform 100, according to some implementations. In some implementations, the residential sensor device platform 100 includes a wireless router 110 and multiple sensor devices 120, 130, 132, 134, 136, 138, 140, 142, and 144. In various implementations, sensor devices 120, 130, 132, 134, 136, 138, 140, 142, and 144 form a wireless mesh network. In various implementations, at least one sensor of sensor devices 120, 130, 132, 134, 136, 138, 140, 142, and 144 maintains a communication link with wireless router 110.

In various implementations, sensor devices 120, 130, 132, 134, 136, 138, 140, 142, and 144 may be a part of and/or integrated with a stationary device in a residence. Such a stationary device may be an electrical switch such as a light switch, a power outlet, or other stationary devices. While implementations are described herein in the context of wall mounted stationary devices, these implementations and other also apply to other types of stationary devices (e.g., table top devices or other surface top devices, as well as appliances).

In some implementations, one sensor device of sensor devices 120, 130, 132, 134, 136, 138, 140, 142, and 144 is operative as a master sensor device, which maintains the communications link with wireless router 110. As shown, in this particular implementation, sensor device 120 maintains the communication link with wireless router 110. As such, sensor device 120 may be referred to as a master sensor device. The other sensor devices 130, 132, 134, 136, 138, 140, 142, and 144 may be referred to as slave sensor devices.

In various implementations, the sensor device that is operative as the master sensor device may change over time. For example, as described in more detail below, if a master sensor device fails, another sensor device may be selected from among the sensor devices to be operative as the new master sensor device.

In some implementations, the non-master sensor devices 130, 132, 134, 136, 138, 140, 142, and 144 form a wireless mesh network. In various implementations, the master sensor device (e.g., sensor device 120) is also a part of the wireless mesh network. For example, in this case, master sensor device 120 and non-master sensor devices 130, 132, 134, 136, 138, 140, 142, and 144 form a wireless mesh network.

In some implementations, other devices (e.g., a mobile device, third-party device, etc.) may also be a part of the wireless mesh network. In some implementations, such other devices may join the wireless mesh network based on authentication. In some implementations, authentication may be controlled with layer two (L2) MAC pre-authorization for network access. In some implementations, authentication may be controlled by higher-level cloud authentication to enable services.

As shown in FIG. 1, in various implementations, each of non-master sensor devices 130, 132, 134, 136, 138, 140, 142, and 144 are either directly coupled to master sensor device 120, or are indirectly coupled to master sensor device 120 through another of the non-master sensor devices. In some implementations, the wireless mesh network operates over at least one link or interface that is different from a link or interface that is the communication link between master sensor device 120 and wireless router 110.

In various implementations, residential sensor device platform 100 is self-healing. For example, any sensor device may function as a master sensor device. If a particular master sensor device becomes inoperable, another sensor device may take over as the master sensor device. In other words, the role of a master sensor device may change over time. In some implementations, the master sensor device may be the sensor device closest to the wireless router. In some implementations, the master sensor device may be the sensor device that first detects a motion or activity.

As shown by the exemplary residential sensor device platform 100 of FIG. 1, sensor devices 130, 132, and 136 are directly coupled to master sensor device 120. Furthermore, as shown, sensor devices 134, 140, and 142 are indirectly coupled to master sensor device 120 through sensor devices 130, 132, and 136. Sensor devices 130, 132, and 136 can be designated as first order wireless mesh network nodes that are one wireless hop from master sensor device 120. Sensor devices 134, 140, and 142 can be designated as second order wireless mesh nodes that are two wireless hops from master sensor device 120. Furthermore, sensor device 144 is indirectly coupled to the master sensor device through sensor devices 142, and can be designated as a third order wireless mesh node that is three wireless hops from master sensor device 120.

In various implementations, the sensor device may detect not only sensed occupancy but may also detect activity, and distinguish among different objects such as humans, pets, robots, appliances, machinery, etc. For example, the sensor device may determine room usage based on movement patterns, type of motion or activity, size or magnitude of motion or activity, etc. In various implementations, the sensor device may detect particular activities in human behavior that occur in the living space (e.g., walking, running, falling, etc.). Based on this activity information, the sensor device may determine if the occupant is a person, pet (e.g., dog, cat, etc.), or other object.

In some implementations, one or more processors of the one or more of the sensor devices 120, 130, 132, 134, 136, 138, 140, 142, and 144 are operative to monitor the behavior of users of the living space, to receive and store the sensed condition over time, and to analyze the sensed condition to identify user behavior. In various implementations, local decisions and control are performed due to processing at each device. In other words, there is no network dependency to perform implementations described herein. In various implementations, multiple load settings may be achieved due to sensing, decisions, and controls residing on the same device.

In some implementations, the wireless mesh network further includes non-sensor devices that communicate with at least a portion of the sensor devices of the wireless mesh network. Such non-sensor devices can include alarm systems.

Figure 2:
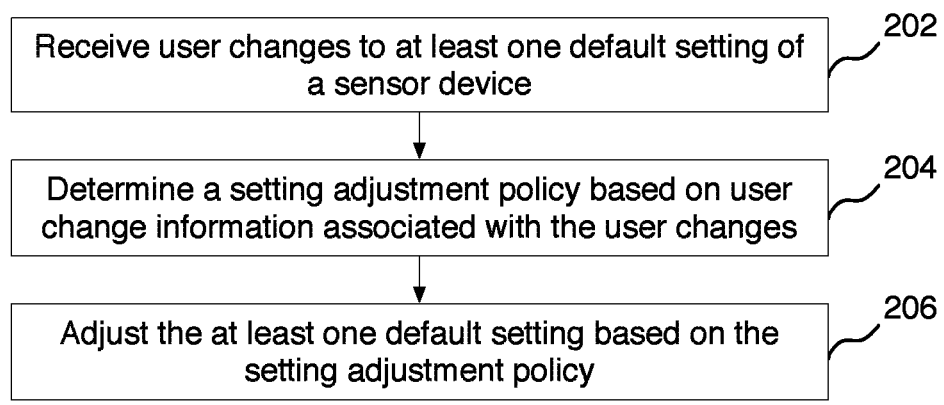
FIG. 2 illustrates an example flow diagram for determining user preferences in a residential sensor device platform, according to some implementations.

FIG. 2 illustrates an example flow diagram for determining user preferences in a residential sensor device platform, according to some implementations. For ease of illustration, example implementations are described herein in the context of a single sensor device, such as sensor device 120. These implementations and others may apply to any sensor device, or any group of sensor devices, such as any one or more sensor devices of FIG. 1.

As described in more detail herein, a residential sensor device determines user preferences in a residential sensor device platform, which enables the residential sensor device to automatically adjust settings associated with the residential sensor device in the living space. While example implementations are described herein in the context of lighting controls, these implementations and others also apply to other environment controls (e.g., temperature controls, etc.).

Referring to both FIGS. 1 and 2, a method is initiated at block 202, where sensor device 120 receives user changes to at least one default setting of sensor device 120. In various scenarios, each sensor device may come out of the factory with particular default settings. In various implementations, the default settings are based on time periods. For example, a 24-hour day may be divided into multiple portions or time periods (e.g., hourly time periods, morning time period, afternoon time periods, evening time periods, etc.). In some implementations, default settings may be vary depending on the time period. For example, the amount of light output of sensor device 120 may be set at 50% by default at 3 p.m., at 80% by default at 6 p.m., 90% at 8 p.m. As a result, there may be morning defaults, afternoon defaults, evening defaults, etc. During a given time period, a user may change the default setting of sensor device 120 to a more desirable setting (e.g., 90%, 100%, etc.) if the user believes that the default setting is too low and wants increased light. The user may make such user changes multiple times within a given time period. In various implementations, sensor device 120 registers/records and stores each time the user changes the setting, and records each value to which the user changes the default setting, and records the time period during which each of the user changes were made.

In some implementations, sensor device 120 determines the number of user changes within a time period. For example, the user may change the setting 5 times during a 6:00 p.m. to 7:00 p.m. time period, etc.. Sensor device 120 may then store that number and time period. Sensor device 120 determines the number of user changes for multiple time periods, as user changes occur. In various implementations, the time period may be predetermined or dynamically determined. For example, the time period may be any predetermined time period (e.g., 6:00 p.m. to 7:00 p.m., etc.). In some implementations, the time period may be dynamically determined. For example, sensor device 102 may automatically adjust the time period based on when and how often the user changes the setting. For example, if the user changes the setting often 10 times during a 6:00 p.m. to 7:00 p.m. time period, the system may divide the 6:00 p.m. to 7:00 p.m. time period into two time periods (e.g., 6:00 p.m. to 6:30 p.m., 6:30 p.m. to 7 p.m., etc.). In another example, if the user changes the setting infrequently (e.g., once) during a 11:00 p.m. to 1:00 a.m. time period, the system may consolidate time periods (11:00 p.m. to 1:00 a.m., etc.).

In some implementations, sensor device 120 then compares the number of user changes to a setting threshold. Sensor device 120 then automatically adjusts the default setting if the number of user changes exceeds the setting threshold. For example, sensor device 120 may determine that a particular number user changes (e.g., 5) exceeds a setting threshold (e.g., 4). As such, sensor device 120 may automatically adjust the default setting. In some implementations, sensor device 120 may automatically adjust the default setting to the most recent setting changed by the user.

In various implementations, the setting threshold may be predetermined (e.g., 2, 3, 4, etc.) or dynamically determined. For example, sensor device 102 may automatically adjust the setting threshold based on when and how often the user changes the setting.

In some implementations, the setting threshold may be based on a time period. For example, the setting threshold may be set for one value during the day, another value in the evening and set to another value during sleeping hours, etc. In some implementations, at least one known setting may include light level. For example, the setting threshold may be set for a particular light level during the day and set to another light level at night.

At block 204, where sensor device 120 determines a setting adjustment policy. In various implementations, the setting adjustment policy is based on user change information associated with the user changes. In various implementations, the setting adjustment policy may be based on one or more of a combination of factors. For example, in some implementations, the setting adjustment policy may be based on environmental information. In various implementation, the environmental information may include information associated with different times or time periods. Such times or time periods may be portions of longer standard time periods. For example, in some implementations, the environment information may include the time of day. (e.g., 7:00 a.m., 12:00 p.m., 6:30 p.m., etc.). In some implementations, the environment information may include a time period or portion of the day. For example, such time periods may include times between 6:00 a.m. and 12:00 p.m. (e.g., morning, etc.), between 6:00 a.m. and 9:00 a.m. (e.g., when individuals prepare for work, school, etc.), between 12:00 p.m. and 6:00 p.m. (e.g., afternoon), between 2:00 p.m. and 7:00 p.m. (e.g., when individuals return home from school, work, etc.), between 6:00 p.m. and 12:00 a.m. (e.g., evening), between 7:00 p.m. and 12:00 a.m. (e.g., when individuals are doing various evening activities, etc.), between 12:00 a.m. and 6:00 a.m. (e.g., early morning, etc.), etc.

In some implementations, the environment information may include the time of year or season (winter, spring, summer, fall, etc.). In some implementations, the environmental information may include indoor environmental information and outdoor environmental information. In some implementations, the environmental information may include other types of information. For example, in some implementations, the environmental information may include temperature (60° F., 80° F., etc.). In various implementations, the environmental information may include both indoor environmental information and outdoor environmental information. In some implementations, the indoor environmental information may include the amount of ambient light (e.g., including natural light coming in from a window or windows, etc.). In some implementations, the outdoor environmental information may include the weather conditions (e.g., whether the outside is sunny, overcast, etc.). Outdoor environment information may also include barometric pressure, humidity, etc.

In various implementations, the environmental information may inform sensor device 120 why the user may have adjusted a default setting. For example, sensor device 120 may determine that the user turned up the light and that this user change corresponds with the time being in the evening (e.g., 7:00 p.m.), around dusk (e.g., getting dark), and during spring. If the user changes the default setting multiple times when the environment information has not changed, sensor device 120 will learn the user preferences in the context of the environmental information. This correspondence may be indicative as to why the user adjusted the default setting (e.g., because the environment naturally become darker). As described in more detail herein, sensor device 120 may automatically adjust the default setting based on these factors. For example, during a different time of year (e.g., winter) when it gets dark earlier in the evening, sensor device 120 may automatically adjust the default setting accordingly.

In some implementations, the setting adjustment policy may be based on differences between the at least one default setting and a quantifiable user change. For example, the setting adjustment policy may automatically adjust the default setting proportionally to the amount of the user change. For example, if the user changes a light setting to 80% of the maximum, the sensor device may automatically adjust the default setting based on an 80% of maximum or other proportional value.

In some implementations, the setting adjustment policy may be based on general user changes to a default setting. For example, if different users make adjustments to sensor device 120, sensor device 120 might not distinguish between the different users. In other words, sensor device 120 may combine the number of user changes from the different users into one number (e.g., an average, etc.).

In some implementations, the setting adjustment policy may be based on specific user changes to a default setting. For example, if different users make adjustments to sensor device 120, sensor device 120 may distinguish between different users. In other words, sensor device 120 would not combine the number of user changes from different users into one number. Instead, sensor device 120 may track the number user changes for individual users. In various implementations, sensor device 120 may distinguish between different users and their respective user changes based on their wearable smart devices or other mobile devices if carried with them. For example, sensor device 120 may associate one or more smart or mobile devices with a particular person. In some implementations, sensor device 120 may associated a given smart or mobile device with a particular person based on detected activity and activity patterns. For example, if a particular user has a pattern of sitting on a particular sofa to read for a certain amount of time and that user carries his or her cell phone, sensor device 120 may associated the cell phone with the user.

At block 206, where sensor device 120 adjusts the at least one default setting based on the setting adjustment policy. For example, a setting adjustment policy may be for sensor device to automatically increase the amount of light at dusk, at a particular time, etc.

In some implementations, if an setting adjustment policy is based on specific user changes to a default setting, sensor device 120 may automatically adjust the default setting for a particular user if sensor device detects the presence of that user. In some implementations, if sensor device 120 detects the presence of multiple users, sensor device 120 may automatically adjust the default setting based on a particular setting adjustment policy. For example, if sensor device 120 detects the presence of multiple users, sensor device 120 adjust a setting based on an average of adjusted default settings associated with multiple uses, etc.).

Figure 4:
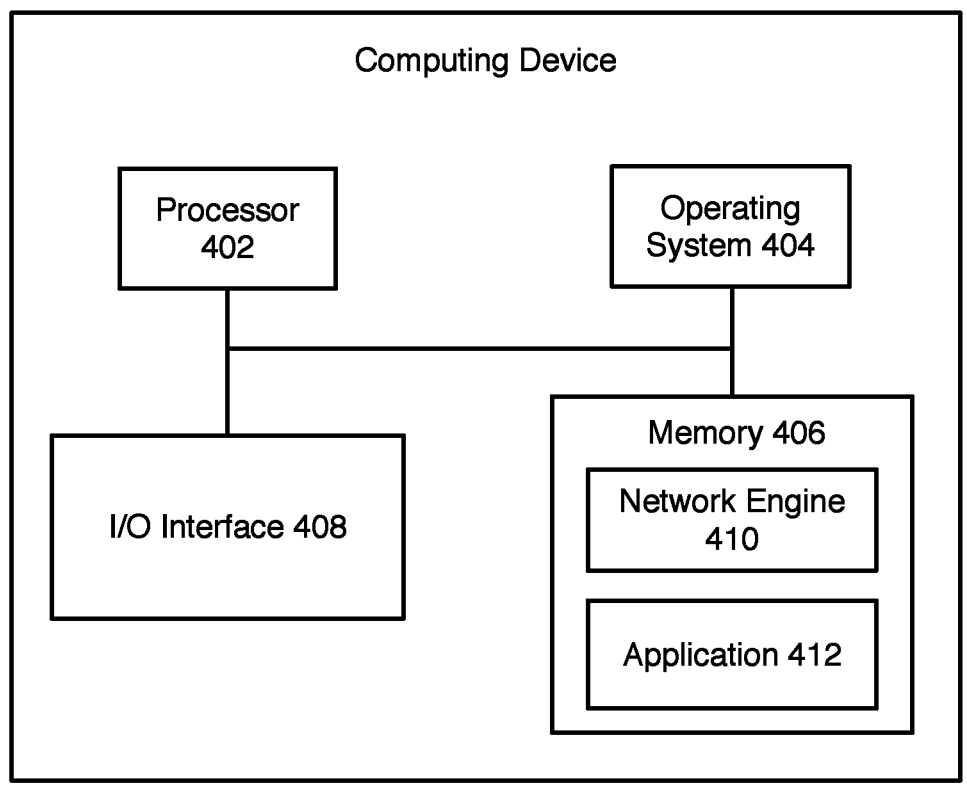
FIG. 4 illustrates a block diagram of an example computing device, according to some implementations.

Although the steps, operations, or computations may be presented in a specific order, as shown in the example of FIG. 4, the order may be changed in particular implementations. The ordering of blocks 402 through 410 is merely one example ordering. Other orderings of the blocks/steps are possible, depending on the particular implementation. For example, blocks 408 and block 410 may occur simultaneously, or in any order.

In some implementations, sensor device 120 may send one or more adjustment values for each of one or more default setting to one or more other sensor devices. As a result, multiple sensor devices may share information on user preferences with each other. As such, sensor device 120 and other sensor devices learn the user preferences through the living space and in the context of the environmental information (e.g., time of day, weather patterns, season, etc.). In some implementations, sensor device 120 and other sensor devices may learn how the user sets different sensors devices in different rooms, across the house. In various implementations, as the user moves from room to room, sensor device 120 may automatically adjust setting based on the user preferences.

In various implementations, the sensor devices of residential sensor device platform 100 socialize with each other by sharing information with each other and learning from each other. For example, in various implementations, sensor device 120 exchanges user preference information with other sensor devices in the network of sensor devices via a master sensor device and/or wireless router. In some implementations, sensor device 120 may function as the master device. In various implementations, sensor device 120 aggregates user preference information from itself and other sensor devices if available.

In various implementations, the sensor devices share information and socialize based on one or more attributes. Different sensor devices may share intelligence with other sensor devices in order to optimize protocols of the applications. In some implementations, one attribute may be a particular group to which a given sensor device belongs. For example, one or more sensor devices may belong to a particular ambient sensor group. One or more sensor devices may belong to a particular physical location (e.g., a particular room, a particular portion of a house, etc.). In some implementations, a group of sensor devices need not be in the same house. In some implementations, different sensor devices may have different degrees of adjustments for the same user due to different environmental conditions. For example, different rooms in a home may have different amounts of natural light (e.g., due to the number windows, the location and size of the windows, etc.). As such, for a room or living space with ample natural light during the daytime, a sensor device may increase the amount of light less than a room with little natural light.

In various implementations, one sensor device may be a part of multiple groups, where each group may serve one or more different purposes. For example, a group of sensor devices may be implemented in connection a user preference application and/or other applications.

In various implementations, sensor device 120 and other sensor devices may learn one or more user preference information. In various implementations, sensor device 120 may use pattern matching, pattern learning, and/or machine learning in order to intelligently learn user preferences in the living area. For example, if a given user preference signature is that dusk if at 7:00 p.m., sensor device 120 and other devices may automatically increase the amount of light in the living space. As such, the user need not manually enter information to set the system in the predetermined mode, because the system goes into the predetermined mode automatically.

Figure 3:
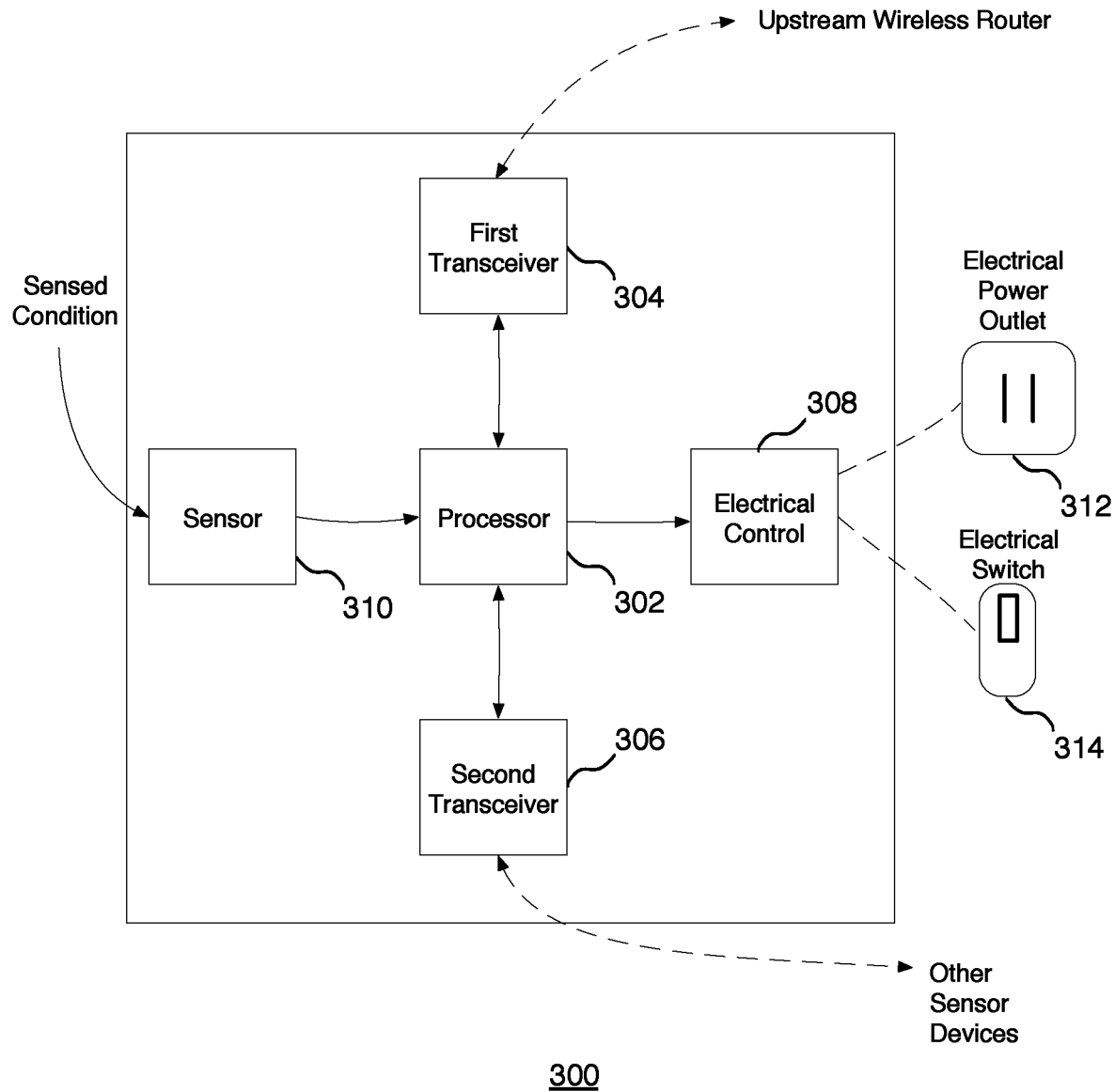
FIG. 3 illustrates a block diagram of an example sensor device, according to some implementations.

FIG. 3 illustrates a block diagram of an example sensor device 300, according to some implementations. In various implementations, sensor device 300 is a residential sensor device that is implemented in residential environments. Sensor device 300 may also be referred to as residential sensor device 300. Sensor device 300 is not limited to residential environments and may be implemented in non-residential environments, including both indoor and outdoor environments. In various implementations, sensor device 300 may be used to implement sensor device 120 of FIG. 1 and/or any of the other sensor devices of FIG. 1.

As shown, for this particular implementation, residential sensor device 300 may be used to implement one or more of multiple sensor devices in a network, such as a wireless network, a wireless mesh network, etc.

In various implementations, when a first sensor device is configured, the rest of the sensor devices are self-configuring in that they automatically configure themselves based on the configuration of the first sensor device.

As described in more detail below, sensor device 300 has a multi-virtual network interface (e.g., a dual interface, etc.). In some implementations, one interface may be used for an uplink mode (e.g., Internet mode) to link to a wireless router, etc. In some implementations, a second interface may be used for a mesh mode to link to mesh nodes, etc. For example, in various implementations, sensor device 300 includes a controller or processor 302. In various implementations, sensor device 300 also includes a first transceiver 304 operative to support uplink communication with a wireless router. In various implementations, the wireless router is an upstream wireless router. Sensor device 300 also includes a second transceiver 306 operative to support mesh link communication with other sensor devices. Sensor device 300 also includes an electrical control 308 that controls one or more electrical power outlets 312 and/or one or more electrical switches 314. In various implementations, sensor device 300 includes a sensor 310 operative to sense a condition of a living space. For ease in illustration, one sensor 310 is shown. However, in various implementations, sensor 310 may represent multiple sensors. For example, sensor device 300 may include a light sensor, a motion sensor, a thermometer, a barometer, a moisture sensor, etc. In some implementations, processor 302 is operative to communicate with the wireless router through the first transceiver, communicate with other sensor devices through the second transceiver, and receive the sensed condition of the living space. As indicated herein, a living space may include indoor and outdoor spaces.

In various implementations, if sensor device 300 functions as a master sensor device, sensor device 300 is configured with a dual link, having both an uplink to the upstream wireless mesh router and a mesh link to the other sensor devices of the mesh network. In various implementations, the other sensor devices of the mesh network (e.g., slave sensor devices) are configured only with the mesh link.

If any new sensor device is added to the mesh network, the new sensor device may self configure similar to the other non-master sensor devices of the wireless mesh network. As such, implementations provide automatic-range extender functionality.

In various implementations, one or more processors of the sensor devices are operative to select a master sensor device from the sensor devices, where the master sensor device maintains communication with the wireless router, and where other sensor devices of the sensor devices are designated as slave sensor devices and form a wireless mesh network with the other sensor devices through wireless communication with the other sensor devices through the second transceivers of the slave sensor devices.

For ease of illustration, FIG. 3 shows one block for each of processor 302, first transceiver 304, second transceiver 306, electrical control 308, sensor 310, electrical power outlet 312, and electrical switch 314. Each of blocks 302, 304, 306, 308, 310, 312, and 314 may represent multiple first transceivers, second transceivers, electrical controls, sensor devices, processors, electrical power outlets, and electrical switches.

In other implementations, sensor device 300 may not have all of the components shown and/or may have other elements including other types of elements instead of, or in addition to, those shown herein. For example, sensor device 300 may be implemented by computing device 400 of FIG. 4, which is described in more detail below. In various implementations, sensor device 300 may include a combination of some or all of the elements shown in FIGS. 3 and 4, and may include other types of elements instead of, or in addition to, those shown in FIGS. 3 and 4.

In some example implementations, sensor device 300 function as a master sensor device. However, other sensor devices may also function as master sensor devices. Also, in some scenarios, sensor device 300 may function as a slave sensor device relative to another master sensor device. In some implementations, the residential sensor device platform may include multiple different master sensor devices at a given time. For example, there may be multiple master sensor devices for different applications.

In various implementations, sensor device 300 and the sensor devices of the residential sensor device platform may be referred to as a hybrid mesh, because the sensor devices may have functions and capabilities of a mesh network, and the sensor devices may also have one or more master sensor devices simultaneously or serially. In various implementations, the sensor devices of the residential sensor device platform may include point-to-point plus repeater functionality.

Link or interface differentiation between the master sensor device and the mesh versus the master device and the wireless router may be achieved according to the following implementations. For example, in various implementations, the different links are dual interfaces in that one interface is among sensor devices of a mesh network, and a different, separate interface is between the master sensor device and a wireless router. In various implementations, the different links may be implemented as a dual interface or dual channel using a common radio, or multiple links or channels of a common radio.

In some implementations, one or more processors of respective sensor devices are operative to select the master sensor device from the sensor devices, where the master sensor device maintains communication with the upstream wireless router. In various implementations, as indicated above, the non-master sensor devices of the wireless sensor devices are designated as slave sensor devices. In various implementations, the wireless devices form a wireless mesh network through wireless communication through their respective second transceivers.

In some implementations, each sensor device checks or determines its proximity to the access point or upstream wireless router. In some implementations, the proximity is estimated based on the signal strength or signal quality of signals received by the device from the upstream wireless router. The sensor device having the highest received signal strength of the highest signal quality wins. That sensor device with the highest signal quality is selected as the master sensor device, and the other sensor devices are designated as the slave sensor devices. In some implementations, the sensor device closest to a home access point becomes the master sensor device with dual interface (e.g., active, active). The other sensors devices become slaves and participate in client mode (e.g., active, passive).

In some implementations, mobile applications may directly connect to any sensor device. In some implementations, each sensor device may configure itself through network sharing (e.g., physical unclonable function (PUF) and/or advanced encryption standard (AES) 128-bit encryption, etc.). In various implementations, third-party devices may participate in the quasi-mesh network if authenticated. In some implementations, slave devices send data to a master device every predetermined time period (e.g., every 10 minutes, 15 minutes, etc.), which is configurable. In some implementations, a master sensor device packages data from all devices in a predetermined time period (e.g., 10-minute window, 15-minute window, etc.), and pushes the data to the cloud server, which in turn may push the data to one or more applications at predetermined time periods (e.g., every 10 minutes, 15 minutes, etc.). In some implementations, one or more applications may automatically synchronize data with the cloud servers at predetermined time interviews (e.g., hourly basis, etc.) if data is not pushed from the cloud server. Real-time info may be available on refresh or based on event policies. Applications directly interact with local devices.

In some implementations, if the selected master sensor device fails, the one or more processors of the sensor devices reselect the master sensor device from the other sensor devices. That is, the wireless mesh network formed by the sensor devices is operative to configure themselves to self-configure or self-heal if one or more of the sensor devices fail. For example, in some implementations, the self-healing may include sensor devices of the wireless mesh network selecting a new master sensor device if the present master sensor device fails. In various implementations, all sensor devices have dual link, uplink, and mesh link functionality, and any of the currently non-master sensor devices may be eligible to become a new master device. In some implementations, a sensor device that was previously a master sensor device and that was later replaced (e.g., due to failure or other reason, etc.) may again be selected as the new master sensor device based on one or more predetermined criteria (e.g., getting fixed, etc.).

In some implementations, the self-healing includes selecting new routing paths from the master device to downstream sensor devices if one or more of the sensor devices of the residential sensor device platform fail. In various implementations, the meshing functionality of the sensor devices provides auto-range extender functionality for other devices to participate as a network service provider.

In some implementations, the signal strength or quality determination and rankings are further used to identify the second best and/or third best signal strengths, and the sensor devices are ranked accordingly. These sensor devices can be used as backup master sensor devices if the current master sensor device fails for some reason. In various implementations, the ranking is based on signal strengths and may be used to determine a priority for backup. For example, in some implementations, the highest-ranking sensor device may be selected as the master sensor device. If the highest-ranking sensor device is not available, the next highest ranking sensor device may be selected as the master sensor device. If there is a tie, the master sensor device may be selected randomly or based on another aspect (e.g., proximity, etc.).

In some implementations, one or more of the sensor devices are associated with one or more electrical power outlets and/or and one or more electrical light switches.

In various implementations, each of the one or more processors of the one or more of respective sensor devices is operative to control operation of the electrical control (which may in turn control one or more electrical power outlets and/or one or more electrical light switches) based on at least the sensed condition of the living space. In some implementations, the sensed condition may be based on various types of sensors (e.g., a light sensor, a motion sensor, a thermometer, a barometer, etc.) indicating various aspects of the living space.

In various implementations, each of the one or more processors of the one or more respective sensor devices is operative to control operation an electrical control (which may in turn control one or more electrical power outlets and/or one or more electrical light switches) based on at least the sensed occupancy of the living space. In some implementations, the sensed occupancy may be based on a motion sensor indicating that the living space is being occupied by a person. In some implementations, the sensed occupancy may include a sensed occupancy of a space proximate to the one or more sense devices. In some implementations, the sensed condition includes a sensed occupancy.

In various implementations, the sensed conditions and/or the sensed occupancy may be shared over the mesh network to control one or more of the power outlets or one or more of the electrical switches. The control may include turning the power of the one or more power outlets on or off, or switching the one or more electrical switches on or off.

In some implementations, one or more processors of sensor device 300, as well as those of other sensor devices, are operative to at least partially control operation of another device. In some implementations, the other devices may include one or more of a water heater, watering systems, garage door, etc. The sense information of sensor device 300 may be used to determine a condition of another device, and advantageously control the other device. For example, sensed occupancy (or the lack of) can be used to determine whether a water heater should be active or not. Generally, the other devices need not necessarily have a sensor. Such devices may rely on the sensing information of one of the sensor devices.

In some implementations, one or more processors of sensor device 300, as well as those of other sensor devices, are operative to at least partially control operation of the sensor devices themselves or another device based on timing. For example, situations can include control of certain lights of a residence that need to be turned on, for example, at 8:00 PM, but ideally also take in account occupancy within the residence. For example, front lights of a residence and back lights of the residence may be controlled differently depending upon occupancy within the residence.

In some implementations, one or more processors of sensor device 300, as well as those of other sensor devices, are operative to at least partially control operation of themselves or another device based on environmental parameters.

FIG. 4 illustrates a block diagram of an example computing device 400, according to some implementations. For example, computing device 400 may be used to implement a sensor device such as sensor device 300 of FIG. 3, sensor device 120 and/or other sensor devices of FIG. 1, as well as to perform the implementations described herein. In some implementations, computing device 400 includes a processor 402, an operating system 404, a memory 406, and an input/output (I/O) interface 408. Computing device 400 also includes a network engine 410 and an application 412, which may be stored in memory 406 or on any other suitable storage location or computer-readable medium. Application 412 provides instructions that enable processor 402 to perform the functions described herein and other functions. For ease of illustration, one application 412 is shown. Application 412 may represent multiple applications. For example, multiple applications such as a lighting application or other environment control application may be stored in memory 406 and executed by processor 402.

For ease of illustration, FIG. 4 shows one block for each of processor 402, operating system 404, memory 406, I/O interface 408, network engine 410, and application 412. These blocks 402, 404, 406, 408, 410, and 412 may represent multiple processors, operating systems, memories, I/O interfaces, network engines, and applications. In other implementations, computing device 400 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and implementations. For example, some implementations are described herein in the context of a wireless mesh network system. However, the implementations described herein may apply in contexts other than a wireless mesh network.

Note that the functional blocks, methods, devices, and systems described in the present disclosure may be integrated or divided into different combinations of systems, devices, and functional blocks as would be known to those skilled in the art.

In some implementations, a non-transitory computer-readable storage medium carries program instructions thereon, where the instructions when executed by one or more processors cause the one or more processors to perform operations including one or more of the steps described herein.

In some implementations, a method includes one or more means for performing one or more of the steps described herein.

In some implementations, a system includes one or more processors, and logic encoded in one or more tangible media for execution by the one or more processors. When executed, the logic is operable to perform operations including one or more of the steps described herein.

In some implementations, a system includes a storage device, and one or more processors accessing the storage device and operable to perform operations including one or more of the steps described herein.

The foregoing description includes references to the accompanying drawings, which form a part of the detailed description. The drawings show specific implementations by way of illustration. In the various descriptions, these embodiments are also referred to herein as "implementations" and/or "examples." Such examples may include elements in addition to those shown or described. Such examples may optionally omit some elements mentioned. Moreover, such examples may include any combination or permutation of those elements shown or described (or one or more aspects thereof).

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), solid state memory (e.g., flash memory, etc.), or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, etc.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication or transfer of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A residential electrical switch sensor device comprising:
    one or more sensors operative to sense activity in a living space;
    one or more processors; and
    logic encoded in one or more non-transitory computer-readable storage media for execution by the one or more processors and when executed operable to perform operations comprising:
    receiving a plurality of user changes to at least one default setting of the sensor device, wherein the sensor device is selected as a master device among a plurality of sensor devices in a mesh network, and wherein the mesh network is configured to self-heal by replacing the sensor device as the master device by a second sensor device in the self-healing mesh network if the sensor device fails;
    determining a setting adjustment policy, wherein the setting adjustment policy is based on user change information associated with the plurality of user changes; and
    adjusting the at least one default setting based on the setting adjustment policy.

2. The sensor device of claim 1, wherein the default settings are based on time periods.

3. The sensor device of claim 1, wherein the setting threshold is based on a time period.

4. The sensor device of claim 1, wherein the sensor device sends at least one adjusted default setting to one or more other sensor devices in the mesh network as a user moves from room to room.

5. The sensor device of claim 1, wherein the setting adjustment policy is based on environmental information.

6. The sensor device of claim 1, wherein the setting adjustment policy is based on differences between the at least one default setting and a quantifiable user change.

7. The sensor device of claim 1, wherein the logic when executed is further operable to perform operations comprising sending an adjustment value for the adjusting of the at least one default setting to one or more other sensor devices.

8. A non-transitory computer-readable storage medium carrying program instructions thereon, the instructions when executed by one or more processors are operable to perform operations comprising:
   receiving a plurality of user changes to at least one default setting of a sensor device, wherein the sensor device is selected as a master device among a plurality of sensor devices in a mesh network, and wherein the mesh network is configured to self-heal by replacing the sensor device as the master device by a second sensor device in the self-healing mesh network if the sensor device fails;
   determining a setting adjustment policy, wherein the setting adjustment policy is based on user change information associated with the plurality of user changes; and
   adjusting the at least one default setting based on the setting adjustment policy.

9. The computer-readable storage medium of claim 8, wherein the default settings are based on time periods.

10. The computer-readable storage medium of claim 8, wherein the setting threshold is based on a time period.

11. The computer-readable storage medium of claim 8, wherein the at least one known setting comprises light level.

12. The computer-readable storage medium of claim 8, wherein the setting adjustment policy is based on environmental information.

13. The computer-readable storage medium of claim 8, wherein the setting adjustment policy is based on differences between the at least one default setting and a quantifiable user change.

14. The computer-readable storage medium of claim 8, wherein the logic when executed is further operable to perform operations comprising sending an adjustment value for the adjusting of the at least one default setting to one or more other sensor devices.

15. A computer-implemented method for operation of a residential electrical switch sensor device platform, the method comprising:
   receiving a plurality of user changes to at least one default setting of a sensor device, wherein the sensor device is selected as a master device among a plurality of sensor devices in a mesh network, and wherein the mesh network is configured to self-heal by replacing the sensor device as the master device by a second sensor device in the self-healing mesh network if the sensor device fails;
   determining a setting adjustment policy, wherein the setting adjustment policy is based on user change information associated with the plurality of user changes; and
   adjusting the at least one default setting based on the setting adjustment policy.

16. The method of claim 15, wherein the default settings are based on time periods.

17. The method of claim 15, wherein the setting threshold is based on a time period.

18. The method of claim 15, wherein the at least one known setting comprises light level.

19. The method of claim 15, wherein the setting adjustment policy is based on environmental information.

20. The method of claim 15, wherein the setting adjustment policy is based on differences between the at least one default setting and a quantifiable user change.

\* \* \* \* \*